United States Patent
Steyer et al.

[11] Patent Number: 5,822,014
[45] Date of Patent: Oct. 13, 1998

[54] PROGRAMMES IN A DIGITAL VIDEO RECEIVER SYSTEM

[75] Inventors: Jean-Marie Steyer, Schiltigheim; Yves Maetz, Strasbourg; Jino Nguyen, Lipsheim; Nour-Eddine Tazine, Plobsheim., all of France

[73] Assignee: Thomas multimedia S.A., Courbevoie, France

[21] Appl. No.: 500,903

[22] PCT Filed: Dec. 1, 1994

[86] PCT No.: PCT/FR94/01403

§ 371 Date: Dec. 13, 1995

§ 102(e) Date: Dec. 13, 1995

[87] PCT Pub. No.: WO95/15646

PCT Pub. Date: Jun. 8, 1995

[30] Foreign Application Priority Data

Dec. 1, 1993 [FR] France .................................. 93 14410

[51] Int. Cl.⁶ .................................................. H04N 5/445
[52] U.S. Cl. .......................................... 348/563; 348/569
[58] Field of Search ................................... 348/563, 564, 348/569, 906; H04N 5/455, 5/50

[56] References Cited

U.S. PATENT DOCUMENTS

| | | |
|---|---|---|
| 5,047,867 | 9/1991 | Strubbe . |
| 5,157,496 | 10/1992 | Kurosawa . |
| 5,223,924 | 6/1993 | Strubbe . |
| 5,446,505 | 8/1995 | Chang Soo .............................. 348/563 |
| 5,517,254 | 5/1996 | Monta ..................................... 348/569 |
| 5,532,753 | 7/1996 | Buchner .................................. 348/569 |

FOREIGN PATENT DOCUMENTS

| | | |
|---|---|---|
| 0488379 | 6/1992 | European Pat. Off. . |
| 0494752 | 7/1992 | European Pat. Off. . |
| 4121314 | 1/1992 | Germany . |
| 2227901 | 8/1990 | United Kingdom . |
| 9310605 | 5/1993 | WIPO . |

*Primary Examiner*—Sherrie Hsia
*Attorney, Agent, or Firm*—Joseph S. Tripoli; Frederick A. Wein

[57] ABSTRACT

There is disclosed a method for selecting programs in a digital video reception system adapted to receive digital data streams. The method comprises the steps of receiving information corresponding to program identification elements; displaying the identification elements in the form of a mosaic of elements (10) on a screen of the reception system, where the arranging of identification elements (10) in the mosaic is performed before transmission; receiving information describing the location of each program thus identified in a data stream broadcast by a transmitter (15); and selecting one of the programs by selecting at least one identifier clement. A device for selecting programs in a digital video reception system is also disclosed.

19 Claims, 3 Drawing Sheets

PROGRAMMES IN A DIGITAL VIDEO RECEIVER SYSTEM

FIELD OF THE INVENTION

The present invention relates to a process and to a device for selecting video programmes. It applies in the audiovisual sector and more particularly in the case in which a multitude of television channels are available from the same receiver.

BACKGROUND OF THE INVENTION

The development of cable and satellite transmission offers the television viewer an ever larger number of channels. However, this increase in the choice of channels is accompanied by a rise in the complexity of the devices and processes for operating the receivers. Indeed, to take just one example, it may be noted that the ergonomics of a television remote control system designed to receive a small number of channels is entirely unsuitable for receiving a much larger number of channels. In the latter case the television viewer has developed a custom consisting in quickly skimming through the channels available so as to ascertain the programmes in progress, or else to watch several channels, jumping from one to the other repeatedly.

SUMMARY OF THE INVENTION

The aim of the invention is to propose a process for selecting video programmes allowing simple selection of programmes, even when they are available in large number.

The subject of the invention is a process for selecting programmes in a digital video reception system, characterized in that it includes the steps:

of receiving information corresponding to programme identification elements, of receiving information describing the location of each programme thus identified in the flows of data broadcast by transmitters, of displaying the said identification elements in the form of a mosaic of elements on a display means of the said reception system, of selecting one of the programmes by selecting at least one identifier element.

According to a particular embodiment, the process according to the invention comprises the step of selecting a programme by way of a means of control of the said system comprising selection means arranged in a similar manner to the identification elements, the actuation of a given selection means having as consequence the selecting of the programme identified by the identification element having the same position as the said selection means.

Thus, the arrangement of the elements representing at least some of the programmes is identical to that of the buttons serving to select them.

The term "programme" designates among other things a television channel or a particular transmission. In digital transmission systems, this term also designates services, assortments of services and events.

The term "selection" designates among other things the action of displaying the identified channel or transmission, the action of operating a recording apparatus such as a video recorder in order to record an identified transmission.

An identification element may comprise, inter alia, a text, graphics and/or a still or moving video image.

An identification element comprises for example a still image representing the channel, the transmission or the type of transmission to which the programme associated with this element corresponds.

The arranging of the identification elements can be performed at the level of the transmitter or dynamically at the level of the receiver device.

According to a particular embodiment of the invention, the means of control is a remote control, the selection means comprising buttons of the said remote control.

According to a preferred embodiment, the selection means comprise the buttons 1 to 9 of the remote control, arranged in three rows of three elements, nine identification elements being arranged on the screen at the same time, these nine elements also being arranged in three rows of three elements.

According to a variant embodiment, the remote control also includes buttons for leafing through several mosaics consecutively.

According to a particular embodiment, the arranging of the identification elements in a mosaic is performed at the level of the transmitter or dynamically at the level of the receiver device.

According to a particular embodiment, the said information relating the identifier elements to the programmes are contained, in a table of correspondences.

According to a particular embodiment, the said correspondence table associates each identification element with a broadcasting channel or vice versa.

According to a particular embodiment, the said table of correspondences contains, in particular, the information required to extract the said programmes from the flow of data.

According to a particular embodiment, the mosaic images are updated and broadcast loopwise, the decoder selecting the image to be displayed and storing the associated correspondence table.

According to a particular embodiment, the video system comprises a decoder of compressed digital signals, for example of signals with the MPEG2 ("Motion Picture Expert Group") format.

According to a particular embodiment, the identification elements are transmitted in the form of compressed images of the "intra" type with the MPEG2 data format. The images are updated and broadcast loopwise (multiplexed with other data), the decoder selecting the image to be displayed. Each image is accompanied by its correspondence table, by an order number distinguishing each table, and consequently each image from another, as well as by the maximum number of different tables.

According to another characteristic of the present invention, the process according to the invention is applied to the manipulation of a television programme guide.

According to this latter embodiment, the programme guide comprises at least one mosaic of identification elements for selecting the time interval of the sought programmes, at least one mosaic for selecting the kind of programme, at least one mosaic for displaying the corresponding programmes [sic] to the time and kind criteria, and at least one mosaic for displaying supplementary information for each programme.

The subject of the invention is also a device for selecting programmes in a digital video reception system, characterized in that it comprises:

means of receiving a signal representing a flow transporting compressed video data, means of demodulating the said signal, means of decoding the demodulated data, means of extracting the said demodulated data from data corresponding to programme identifier elements and from data corresponding to a table of correspondence between the said identifier elements and information indicating the location of the said programmes in the flow of demodulated data.

According to a variant embodiment, the said device moreover includes means (18) of displaying the said identification elements in the form of a mosaic.

According to a variant embodiment, the said device moreover includes selection means (1 to 9) arranged in a manner similar to the identification elements on the said display means (18).

BRIEF DESCRIPTION OF DRAWINGS

Other characteristics and advantages of the invention will emerge through the description of two particular non-limiting embodiment examples illustrated by the attached figures, in which.

DETAILED DESCRIPTION OF INVENTION

Figure 1:
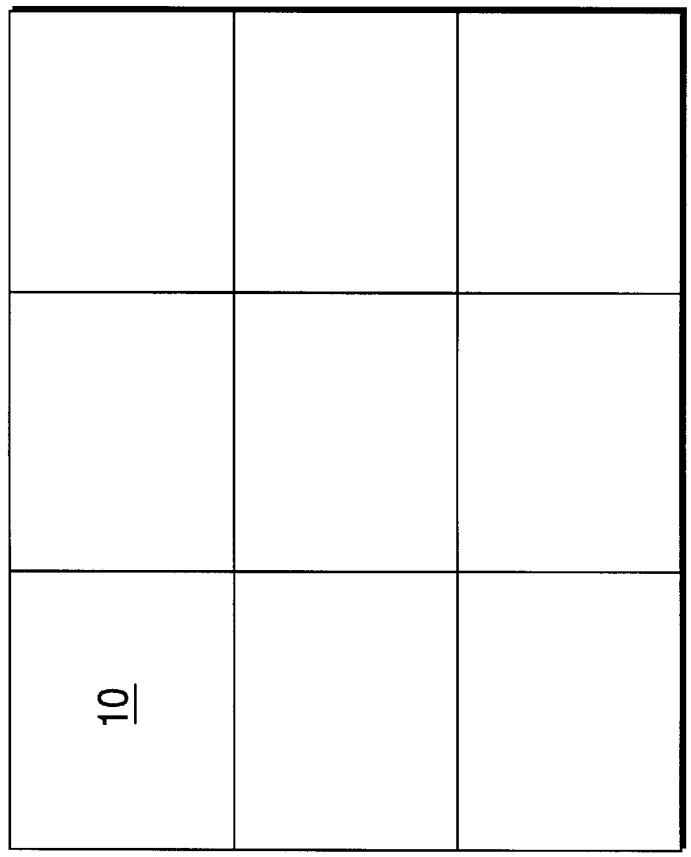
FIG. 1 represents a set of identification elements arranged in a manner conforming to the first embodiment.

The particular example of the process according to the invention includes a step for displaying on the screen a mosaic representing a certain number of programme identification elements. According to the first embodiment and as illustrated in FIG. 1, the mosaic is made up of nine rectangles such as 10, each of which includes a reduced image allowing the easy identification of a particular transmission. For example, a reduced image can represent the displaying of a film or the logo of a transmission. Each identification element represents the transmission in progress (or available within a short time) on one of the available channels.

Figure 2:
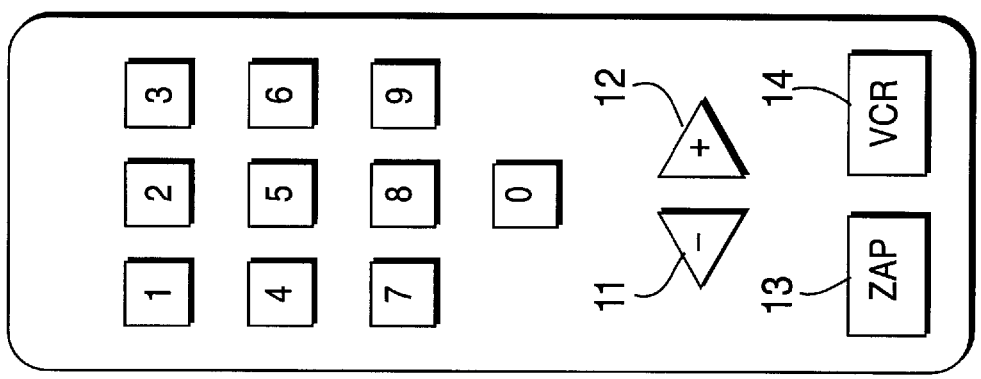
FIG. 2 represents a remote control including a digital pad, such a remote control being used in the first embodiment.

FIG. 2 shows a remote control whose buttons 1 to 9 are arranged in a geometry similar to that of the identification elements. Actuation of the top left button (in this instance the button 1) will lead to the selection of the identifier element 10 at the top left of the image, shown diagrammatically in FIG. 1.

The selecting of an identifier element will have as consequence the displaying of the corresponding channel.

The channels cannot necessarily all be represented by a single mosaic. Accordingly, several mosaics are provided. The user can switch from one mosaic to another by actuating the buttons 11 and 12.

When the user is watching a particular channel, he can switch to the mode for displaying mosaics by pressing the button 13.

When the user wishes to record a particular channel, he first presses the button 14, before selecting an identifier element. The video reception system then turns on a recording apparatus and accordingly the programme via otherwise known means.

Figure 3:
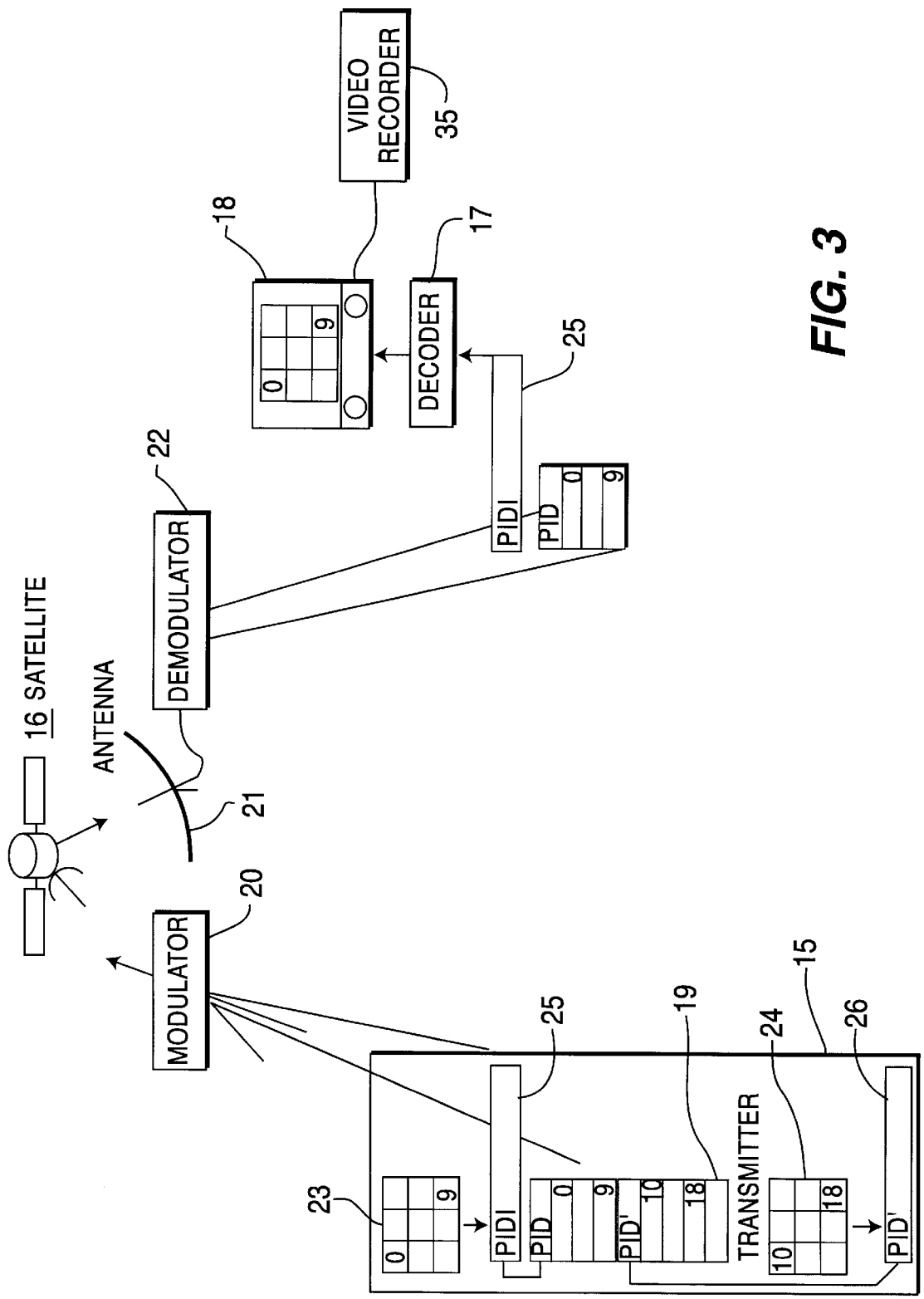
FIG. 3 represents diagrammatically the path for transmitting the images and additional information from the programme supplier to the user.

FIG. 3 illustrates diagrammatically the transmission path used for the images of the mosaics and supplementary information. According to the present example, this is a digital transmission system in which the data are compressed before transmission and expanded at the receiver. Such a system is moreover known per se and uses for example a data format of the MPEG2 type. More information regarding MPEG2 is given in the documents ISO/IEC 13818-1 (ISO/IEC/JTC1/SC29/WG11 NO601 MPEG2 Systems Working Draft) and ISO/IEC 13818-2 (Generic coding of moving pictures and associated audiO [sic]; Recommendation H.262 Committee Draft) of November 1993. The first document describes the format of the digital transport flow, as well as the transmission of service data (especially information relating to the broadcast programmes). The second document describes the compression and expansion system as well as the format of the compressed data. MPEG2 allows, in particular, the transmission of so-called private data.

The transmitter 15 needs to send two types of data: the images representing the mosaics of identifier elements on the one hand, and tables of correspondence between the identifier elements and the broadcasting channels on the other hand. According to a variant embodiment, the correspondence tables comprise, for each identifier element of the mosaic, the information required to retrieve the programme (or information relating to the programme) from the data flow. The nature of this information depends on the organization of the data flow.

Likewise, the correspondence table makes it possible to retrieve, from information contained therein, the corresponding identifier element.

In a first stage, the transmitter formulates the mosaics to be sent, depending upon the channels or transmissions present. The video and audio data are compressed so as to obtain a minimum data throughput. Since the mosaic images do not form part of a sequence exhibiting a high correlation, the compression used can be of the "intra" type, that is to say that when decoding a given image no reference to any other image will be necessary. The images chosen for the identification elements are reduced by virtue of known means, for example by a process of interpolation and decimation of the image. The set of mosaic images is transmitted continuously, with a frequency which depends on the transmission capacities and on the amount of other data.

Insofar as the transmission is digital, the type of data transmitted has little importance. In a known manner, the data are transmitted in the form of transport packets (25 or 26) of 188 bits, the latter including in their headers an identifier code (PID or "Packet Identification Data") identifying their contents. The document ISO/IEC 13818-1 cited above indicates the makeup of a transport packet in its Appendix F.

Reserved codes identify the data packets corresponding to the transmission of the mosaic images and of the correspondence tables which are associated therewith. The packet then contains the header, followed by a correspondence table 19 and by data of the mosaic image (images 23 and 24). The correspondence table 19 simply has the form of a string of bytes, each of which gives a PID number corresponding to the identified programme. It moreover includes an order number which distinguishes it from all the other tables transmitted, as well as the maximum number of existing tables.

MPEG2 defines four tables of service data relating to the programmes broadcast. More particularly two of these tables are advantageously employed by a variant of the present example. These are the programme association table ("PAT") and programme map table ("PMT"). These tables as well as their format are described in detail in the document 13818-1 already cited. The table PAT defines for each programme (identified by a number) the PID identification code of the transport packet containing the definition of this programme. The definition of a programme is contained in a PMT table which itself includes, in particular, the PID identification codes for the packets which contain the information relating to this programme, and most particularly the compressed audio and video data.

The presence of these tables in the data flow makes it possible to extract from this flow the data corresponding to a programme, knowing the number of this programme. In the context of the present variant, it is these programme numbers which are contained in the correspondence table.

The correspondence table or tables, advantageously take the form of private tables ("Private section") such as described in the document 13818-1.

According to a variant embodiment, the compressed mosaic images and the correspondence tables are transmitted in different packets. Each of the packets then contains an identifier establishing the relationship between the mosaic and the table.

The data coming from the transmitter are multiplexed with other data and modulated appropriately by a modulator 20 for transmission by a satellite 16. After reception by an antenna 21, the signals are demodulated by a demodulator 22, and demultiplexed before being processed by a decoder 17.

When the user wishes to display the programme mosaics, he enters "ZAP" mode by pressing the corresponding button 13. (The process of communication between the remote control and the television receiver or the decoder will not be described in further detail, numerous embodiments being known to those skilled in the art). The decoder then monitors the data flow. When it detects a PID corresponding to a mosaic image, it checks the order number of the associated table. If this number is the first number in the order which has been fixed (for example for reasons of consistent presentation of the images), the decoder expands and displays the mosaic image and stores the correspondence table, the order number and the maximum number of tables in an appropriate random access memory. If the order number is not the first, the decoder continues its monitoring. Display is performed on a screen 18.

According to a variant of this particular embodiment of the invention, the decoder displays the first mosaic image encountered.

According to a variant of this particular embodiment, the decoder uses the "Freeze model" option of MPEG2, allowing the display of a still image.

The effect of the user pressing one of the buttons 1 to 9 of the remote control is then a switchover to the channel corresponding to the selected identification element. This is carried out by virtue of a knowledge of the PID codes of the transport packets corresponding to this channel or programme. As mentioned above, the PID codes are transmitted either directly in the correspondence table, or extracted from the PAT and PMT tables. In the latter case, some redundancy is avoided in the transmission of the data.

When the user presses one of the + or − buttons (buttons 11 or 12 respectively), the decoder decrements or increments the stored order number and monitors the data flow until the corresponding packet is detected. The stored value of the maximum number of tables serves to avoid searching for a non-existent table. Incrementation is possible only if the maximum order number is not exceeded.

According to a variant of this embodiment, the identifier elements are transmitted separately and not in mosaic form. In this case, these elements are reordered by the decoder before display.

A "VCR" button 14 makes it possible to switch to record mode. The selected programme is then recorded on a recording apparatus, for example a video recorder 35.

Figure 4:
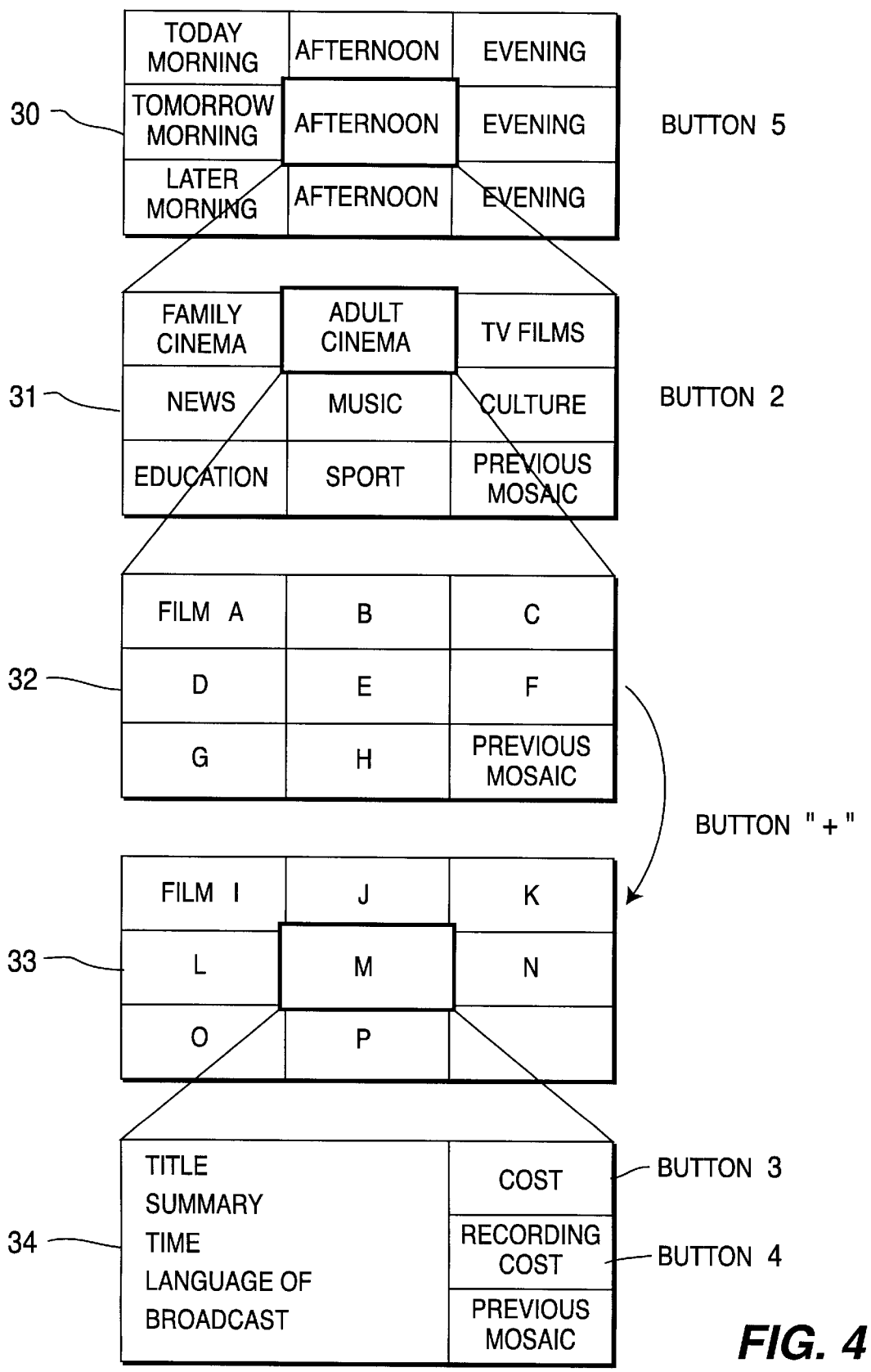
FIG. 4 represents a set of identification elements according to the second embodiment of the invention.

According to the second embodiment of the invention, and as illustrated in FIG. 4, the programme selection process according to the invention is used to manipulate a television programme guide displayed on-screen.

As in the previous example, the mosaics are made up of nine identification elements arranged in a manner similar to the nine buttons 1 to 9 of the remote control. The remote control is the same as in the previous example.

According to the present example, the programme guide is organized as a tree. When an identification element is selected from a given mosaic, the effect of the selection is to display another mosaic giving more precise information. The mosaic 30 is a time filter which makes it possible to select the day and the time slot about which information is desired (for example, tomorrow, the afternoon). Pressing the button 5 of the remote control prompts the display of a second filter in the form of a mosaic 31, making it possible to select the kind of transmission sought (cinema, music, sport, news . . . ). If for example "Adult cinema" is selected, a mosaic 32, each element of which gives a film title, is displayed for a given channel. These are films of the kind regarded as viewable during the selected time interval, on a given channel. It is then possible to change channel by actuating the + or − buttons (buttons 11 or 12) (mosaic 13). The selecting of a film has as consequence the displaying of supplementary information relating to this film, for example the charge for viewing or recording it if it is a film on a pay television channel (mosaic 34).

The guide can obviously be organized differently.

The identification elements can comprise text and/or images, the choice depending on the application, on the capacities of the transmission channel and of the random access memory available at the level of the receiver for data storage. When text is involved, this can be dispatched in ASCII coded form, rather than in the form of a video image, thus allowing a saving of space and a gain in transmission speed. Advantageously, all the data relating to the guide are transmitted just once, so that the decoder does not need to reload data after each selection. This is all the more advantageous the larger the possible number of mosaics: given that a selection is made from among a large number of programmes in accordance with certain criteria, it is simpler to make up the mosaics at the level of the receiver device than to transmit them one by one.

The data making up the programme guide are broadcast loopwise. According to a variant embodiment and with the aim of diminishing the size of the memory required in the decoder, data are loaded only when desired, by monitoring their passing by in the data flow. Once obsolete, these data are replaced by others. Depending on the duration of the broadcasting loop, the data will be available after a more or less lengthy wait.

As previously, the information transmitted is so by data packets. The correspondence tables identify either a relationship between various mosaics, or a channel, and can contain other types of information.

According to a variant of this embodiment, an identification element ("Previous mosaic") is provided making it possible to get back to the mosaic of immediately higher level.

Obviously it is possible to define different mosaics, with more or fewer than nine identification elements, and to provide a remote control accordingly. Likewise, the use of several mosaics having a number of different identifier elements does not depart from the context of the invention.

According to a further variant, the mosaic includes a higher number of identification elements than the number of buttons of the remote control which are intended for selecting programmes.

We claim:

1. Method for selecting programmes in a digital video reception system adapted to receive digital data streams, said method comprising the steps of:
    receiving information corresponding to programme identification elements,
    displaying said identification elements in the form of a mosaic of elements (10) on a display means (18) of said reception system, the arranging of identification elements (10) in said mosaic being performed before transmission;
    receiving information describing the location of each programme thus identified in a data stream broadcast by a transmitter (15);
    selecting one of the programmes by selecting at least one identifier element.

2. Method according to claim 1, wherein the step of selecting a programme is performed by way of a means of control of said reception system comprising selection means (1 to 9) arranged in a similar manner to the identification elements, the actuation of a given selection means (1 to 9) having as consequence the selecting of the programme identified by the identification element having the same position as said selection means.

3. Method according to claim 2, wherein the means of control is a remote control, the selection means comprising buttons of said remote control (1 to 9).

4. Method according to claim 3, wherein the selection means comprise the buttons 1 to 9 of the remote control, arranged in three rows of three elements, nine identification elements being arranged on the display means at one time, these nine elements also being arranged in three rows of three elements.

5. Method according to claim 3, wherein the remote control also includes buttons (11, 12) for leafing through several mosaics consecutively.

6. Method according to claim 1 wherein an identification element (10) comprises one or more of the following items: a text, graphics or a still moving video image.

7. Method according to claim 1, wherein said information relating the identifier elements to the programmes is contained in a table of correspondences (19).

8. Method according to claim 7, wherein said correspondence table associates each identification element (10) with a broadcasting channel or vice versa.

9. Method according to claim 7, wherein said table of correspondences (19) contains, in particular, the information required to extract said programmes from the flow of data (PID).

10. Method according to claim 1, wherein the selection of a programme has as consequence the displaying of the selected programme.

11. Method according to claim 1, wherein the selection of a programme has as consequence the operating of a recording apparatus such as a video recorder (35) for recording the selected programme.

12. Method according to claim 1, wherein the identification elements are transmitted in the form of compressed images of "intra" type.

13. Method according to claim 1 wherein mosaic images formed of programme identification elements are updated and broadcast loopwise, the reception system selecting the image to be displayed and storing the associated correspondence table.

14. Method according to claim 1 wherein the method is applied to the manipulation of a television programme guide.

15. Method according to claim 14, wherein the programme guide comprises at least one mosaic of identification elements for selecting a time interval of sought programmes (30), at least one mosaic for selecting a kind of programme (31), at least one mosaic for displaying programmes corresponding to the time and kind criteria (32), and at least one mosaic for displaying supplementary information for each programme (34).

16. Device for selecting programmes in a digital video reception system, said device comprising:
    means for receiving a signal representing a data stream transporting compressed video data (21),
    means for demodulating said signal (22) to provide demodulated data,
    means for decoding the demodulated data (17),
    means (17) for extracting from the demodulated data information corresponding to programme identifier elements (10, 23, 24) arranged under the form of a mosaic before transmission and information indicating the location of the programmes corresponding to said identifier elements in the stream of demodulated data.

17. Device according to claim 16, further comprising means (18) for displaying the identification elements in the form of a mosaic.

18. Device according to claim 17, further comprising selection means (1 to 9) arranged in a manner similar to the identification elements on said display means (18).

19. Method according to claim 1, wherein said arranging of programme identification elements into said mosaic comprises the inclusion of several programme identification elements into an image to be transmitted.

* * * * *